United States Patent
Zhu et al.

(10) Patent No.: US 10,289,150 B2
(45) Date of Patent: May 14, 2019

(54) MICRO-MOVEMENT SUBASSEMBLY FOR ANGLE ADJUSTMENT

(71) Applicant: Shanghai Institute of Optics And Fine Mechanics, Chinese Academy of Sciences, Shanghai (CN)

(72) Inventors: Jianqiang Zhu, Shanghai (CN); Gengxiu Tang, Shanghai (CN); Zhigang Liu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 39 days.

(21) Appl. No.: 15/619,360

(22) Filed: Jun. 9, 2017

(65) Prior Publication Data

US 2018/0088621 A1    Mar. 29, 2018

(30) Foreign Application Priority Data

Sep. 26, 2016    (CN) .......................... 2016 1 0852452

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *G05G 23/00* | (2006.01) |
| *F16H 25/20* | (2006.01) |
| *G05G 1/08* | (2006.01) |

(52) U.S. Cl.
CPC ............. *G05G 23/00* (2013.01); *F16H 25/20* (2013.01); *F16H 25/2003* (2013.01); *G05G 1/08* (2013.01)

(58) Field of Classification Search
CPC ........... G02B 7/004; G05G 23/00; G05G 1/08
See application file for complete search history.

(56) References Cited

U.S. PATENT DOCUMENTS

| | | | | |
|---|---|---|---|---|
| 2,979,964 | A * | 4/1961 | Walton | G05G 23/00 33/838 |
| 3,700,313 | A * | 10/1972 | Karr | G02B 7/004 359/873 |
| 5,762,345 | A * | 6/1998 | Nowak | B23B 31/207 279/146 |
| 5,862,707 | A * | 1/1999 | Metsala | G02B 7/004 411/226 |
| 6,016,230 | A | 1/2000 | Nunnally et al. | |
| 6,186,016 | B1 | 2/2001 | Cable | |
| 7,400,802 | B2 | 7/2008 | Wyatt et al. | |
| 7,421,918 | B2 | 9/2008 | Cable et al. | |
| 7,982,980 | B2 | 7/2011 | Rigney | |
| 8,441,748 | B2 | 5/2013 | Rigney | |

* cited by examiner

*Primary Examiner* — Jake Cook
(74) *Attorney, Agent, or Firm* — Mei & Mark LLP; Manni Li

(57) ABSTRACT

A micro-movement subassembly as a precise driving screw for angle adjustment, comprising a shank, a turnbuckle, and a central cylindrical shaft. The subassembly is precise for linear displacement, good orientation, stable and reliable adjustment, which can be used for a variety of precision-oriented precision micro-angle adjustment of the drive screw.

1 Claim, 2 Drawing Sheets

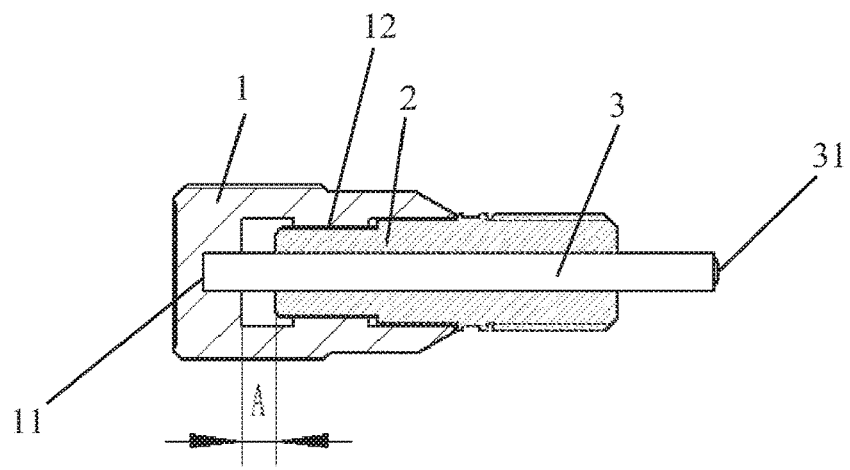
Figure 1
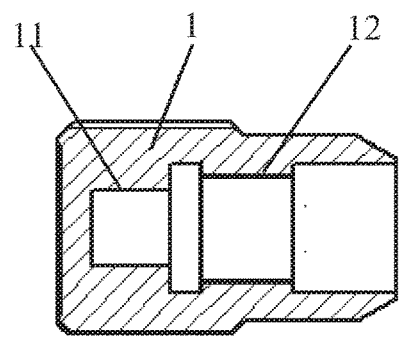
Figure 2(a)
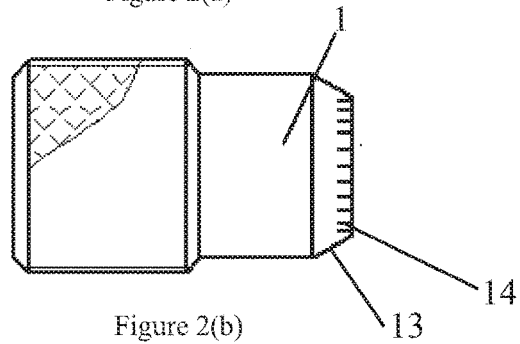
Figure 2(b)
Figure 2

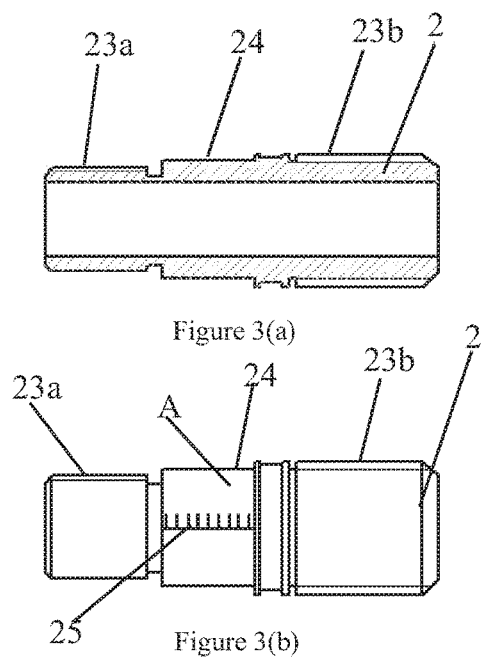
Figure 3(a)
Figure 3(b)
Figure 3
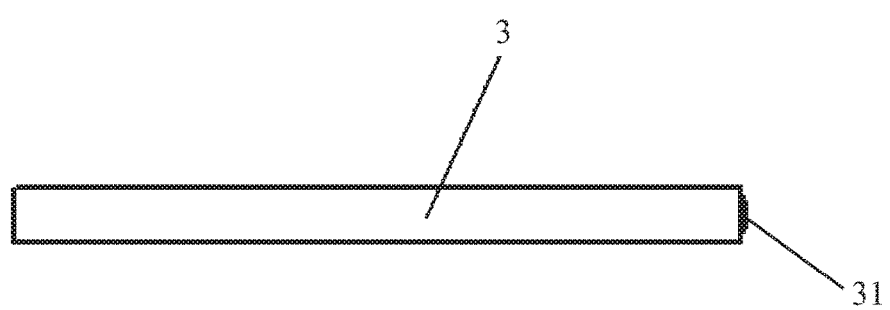
Figure 4

MICRO-MOVEMENT SUBASSEMBLY FOR ANGLE ADJUSTMENT

CROSS-REFERENCE AND RELATED APPLICATION

The subject application claims priority on Chinese patent application No. 201610852452.1 filed on Sep. 26, 2016. The Chinese priority application is incorporated herein by reference.

FIELD OF THE INVENTION

The present invention relates to fine machine processing, particularly, a micro-movement subassembly for angle adjustment.

BACKGROUND OF THE INVENTION

The micro-movement screw subassembly for linear displacement is assembled by screws and screw nuts, and the movement for lead and gear is combined together. However, a gap error always exists between the screw and screw nut, which is caused by error in machine processing for triangular thread surfaces and axial face as well as screw pitch deviation. Generally, when the error is more than 10 µm, it causes inaccurate screw leading linear displacement. Conventionally, the first solution is to use organic powder during the processing, and the second solution is to open an elastic groove on the screw shaft to reduce the gap error between the screw and the screw nut. The first solution is not easy and convenient, as the powder used to fill in the gap continuously falls out and needs to be replenished during work. The second solution does not work well either, while gap is reduced but the leading accuracy is still not good.

SUMMARY OF THE INVENTION

The present invention provides a micro-movement subassembly that is used as a precise driving screw for angle adjustment. The micro-movement subassembly of the present invention separates the movement of the screw lead and gear, thus, to realize the precision linear displacement by current machine processing level which may reach down to several micrometers between the cylindrical surface assembly. The micro-move screw subassembly for angle adjustment of the present invention reduces the lead gap between the lead screws and increases the stability of the leading movement.

The micro-movement screw subassembly of the present invention comprises a shank, a turnbuckle, and a central cylindrical shaft.

In the present invention, the shank is a cylindrical step cylinder with an inner hole at the center of the bottom, as shown on the left in FIG. 1, where the inner hole may be transitionally or interferentially fit with the central cylindrical shaft. The inner wall of the shank is formed of an internally threaded hole structure which fits the outer thread on the outside wall of the turnbuckle. The right side of the hole fits the turnbuckle thread outer circle. The left half section of the outer cylinder is knurling, and the right half section is an outer circle surface with a slope, and the outer circle surface of the slope is marked with the same scale according to the pitch.

In the present invention, the turnbuckle is a hollow shaft having the outer thread on the left and right sides and a step cylinder that may be placed inside the shaft. The inner surface of the hollow shaft is precisely machined. The left outer thread is assembled with the inner thread of the shank; the middle cylinder surface, shown as A in FIG. 1 as marked with the lengthy range of the stroke along the axial center line, is matched with the slope precision scale of the outer circle surface of the outer cylinder to show the travel range and degree of precision.

The central cylindrical shaft has a spherical surface at one end, and is assembled within the precisely machined hollow space inside the turnbuckle.

The turnbuckle is assembled inside the cylinder of the shank with precise screw thread, and the central cylindrical shaft, having the spherical surface on one end, has its other end being inserted in the precisely machined inner surface of the hollow shaft of the turnbuckle while transitionally or interferentially assembled with the inner hole of the shank into a complete assembly; and the spherical surface at the other end of the central cylindrical shaft drives an object by point contact.

The assembly of the present invention may be adjusted as follows. The central cylindrical shaft is inserted into the turnbuckle by smooth slide for leading linear displacement. The turnbuckle is finely assembled with the shank by thread sequentially. Then, one end of the central cylindrical shaft is connected with the central cylinder of the shank through a transition or interference fit. Once the turnbuckle is fixed on, when the shank is turned clockwise, the central cylindrical shaft is driven forward precisely along the thread between them. When the shank is turned counterclockwise, the central cylindrical shaft is driven backward precisely along the thread. The angle position could be precisely adjusted by turning the shank to drive the central cylindrical shaft.

The present invention shows that the displacement is about ±A mm. The leading accuracy depends on the fine assembly of the cylindrical shaft, and as the accuracy of the machine processing may reach to several micrometers, the lead accuracy may reach to several micrometers as well. Thus, the linear displacement is accuracy, movement is reliable, and the assembly may be used as a precise angle adjustment screw.

BRIEF DESCRIPTION OF THE DRAWINGS

FIG. 1 shows a cross sectional view of the micro-movement subassembly of the present invention.

FIG. 2 shows structure of the shank in the micro-movement subassembly of the present invention, where FIG. 2(a) shows a cross section of the shank, and FIG. 2(b) shows the surface view of the shank.

FIG. 3 shows the structure of the turnbuckle in the micro-movement subassembly of the present invention, where FIG. 3(a) shows a cross section of the turnbuckle, and FIG. 3(b) shows the surface view of the turnbuckle.

FIG. 4 shows the surface view of the central cylindrical shaft in the micro-movement subassembly of the present invention.

Reference numbers in the figures denote the following components: 1—shank; 2—turnbuckle; 3—central cylindrical shaft; 11—inner hole of the cylindrical step cylinder; 12—internally threaded hole of the inner wall of the cylindrical step cylinder of shank 1; 13—slope; 14—scale on the slope 13; 23a—first side of the turnbuckle 2; 23b—second side of the turnbuckle 2; 24—step cylinder in the middle of the turnbuckle 2; 25—scale on the step cylinder 24 in the middle of the turnbuckle 2; 31—spherical surface at the second end of the cylindrical shaft 3.

DETAILED DESCRIPTION OF THE INVENTION

In connection with FIGS. 1 to 4, the present invention is further explained in details.

As shown in FIGS. 1 to 4, the micro-movement assembly of the present invention comprises a shank 1, a turnbuckle 2, and a cylindrical shaft 3.

As shown in FIGS. 1 and 2(a)-2(b), shank 1 is a cylindrical step cylinder with an inner hole 11 on the left side for the transition or interference fit with the central cylindrical shaft 3. The inner wall of the cylinder is formed of internally threaded hole 12. The right side of the hole 12 is out of the turnbuckle (2) thread outer circle. The outer surface of the cylindrical step cylinder has the left half section that is knurled and the right half of the outer surface has a slope 13 at the end. The outer circular surface around the end of the slope 13 is marked with the scale 14 according to the pitch.

As shown in FIGS. 1 and 3(a)-3(b), turnbuckle 2 is a hollow shaft with outer thread on the two side, 23a and 23b, and a step cylinder 24 in the middle. The surface of hollow shaft is precise machined. The left outer thread is assembled with the inner thread of the internally threaded hole 12 on the shank (1). The cylinder 24 in the middle has a surface A that is marked with a length range in a scale along the axial center line, where the scale is matched with the scale 14 of the slope 13 for showing the travel range and precision.

As shown in FIGS. 1 and 4, central cylindrical shaft 3 has a spherical surface 31 at one end. The central cylindrical shaft 3 is assembled inside the hollow shaft of turnbuckle 2.

Turnbuckle 2 is assembled in the inside cylinder of shank 1 with precise screw thread. Central cylindrical shaft 3, having a spherical surface 31 at one end, is inserted in the precise hollow shaft of turnbuckle 2 at the other end while transition or interference assembled with the central cylinder of the shank 1 into a complete assembly. The spherical surface 31 at the end of cylindrical shaft drives an object by point contact.

Cylindrical shaft 3 is inserted into turnbuckle 2 by sliding smoothly for leading liner displacement. Turnbuckle 2 is fine assembled with shank 1 by thread sequentially. Then, one end of the central cylinder shaft 3 is connected with the central cylinder of the shank 1 through a transition or interference fit. Once turnbuckle 2 is fixed thereon, when the shank is turned clockwise, the central cylindrical shaft is driven forward precisely along the thread between them. When the shank is turned counterclockwise, the central cylindrical shaft is driven backward precisely along the thread.

The angle position may be adjusted precisely by turning the shank to drive the central cylindrical shaft. The displacement is about ±A mm. Experiment shows that the linear displacement in the assembly of the present invention is accuracy without gap error and the movement is reliable, thus, the assembly may be used as a precise angle adjustment screw.

The scope of the present invention is not limited by the detailed descriptions, and one of ordinary skill in the art could modify and change the structure of the micro-movement assembly without departing from the scope of the present invention.

We claim:

1. A micro-movement subassembly, comprising
a shank having a first end, a second end, an inner hole near the first end inside the shank, an inner wall of an internally threaded hole near the second end inside the shank, and an outside surface that has a first half section near the first end and a second half section near the second end,
a turnbuckle having a first end, a second end, an inside hole with an inner surface, and an outside surface, and
a central cylindrical shaft having a first end, a second end, and an outside surface,
wherein the shank is a cylindrical step cylinder, the first half section of the outer surface is knurled, and the second end has a slope that is circularly marked with a scale according to a pitch;
the turnbuckle is a hollow shaft, the inner surface of the inside hole of the turnbuckle is precision machined to have a precise screw thread, and the outside surface of the turnbuckle has a first part near the first end of the turnbuckle, a step cylinder in the middle, and a second part near the second end of the turnbuckle, and both the first and second parts of the turnbuckle have outer threads;
the outer thread of the first part of the outside surface of the turnbuckle is assembled in the internally threaded hole of the inner wall near the second end of the shank, the outside surface of the step cylinder in the middle of the turnbuckle is marked with a scale in a range of length along a central axial of the turnbuckle, the scale on the outside surface of the step cylinder in the middle matches the scale on the slope of the second end of the shank to show the length traveled and degree of precision; and
the first end of the central cylindrical shaft fits transitionally or interferentially with the inner hole near the first end of the shank, the central cylindrical shaft goes through the hollow shaft of the turnbuckle and the outside surface of the central cylindrical shaft fits inside the inside hole of the turnbuckle through the precise screw thread, and the second end of the central cylinder shaft has a spherical surface for driving an object by point contact.

* * * * *